United States Patent Office 3,544,516
Patented Dec. 1, 1970

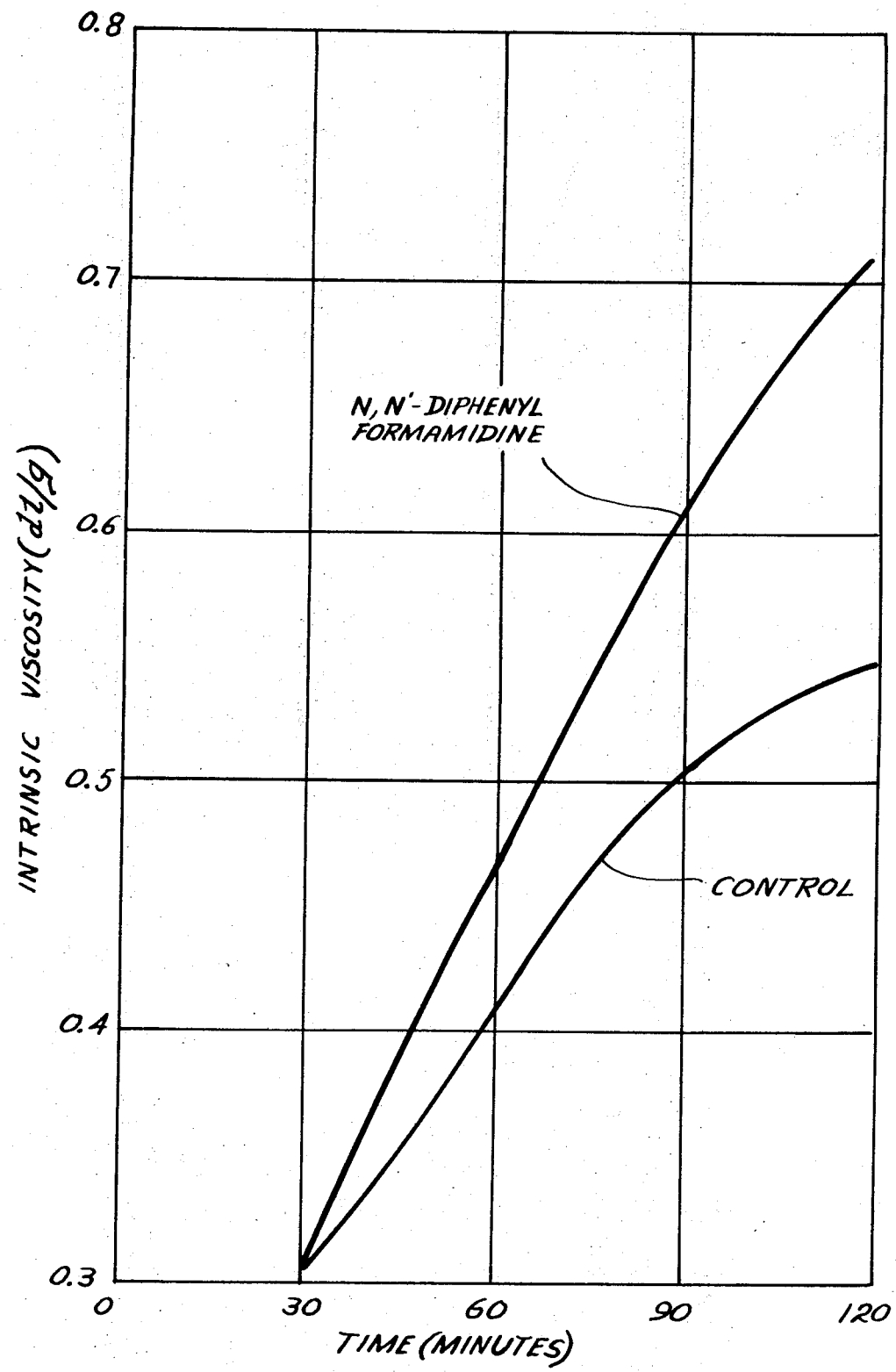

3,544,516
DIARYL FORMAMIDINES AS RATE PROMOTERS IN OXIDATIVE POLYPHENYLENE ETHER FORMATION
Glenn D. Cooper, Delmar, and James G. Bennett, Menands, N.Y., assignors to General Electric Company, a corporation of New York
Filed Mar. 13, 1969, Ser. No. 807,047
Int. Cl. C08g 23/18
U.S. Cl. 260—47      17 Claims

ABSTRACT OF THE DISCLOSURE

A process for the formation of high molecular weight polyphenylene ethers by the oxidative coupling of a phenolic precursor in the presence of a catalyst comprising a primary, secondary or tertiary amine and a copper salt, the process being characterized by the addition of a small but effective amount of a diaryl formamidine. The diaryl formamidine acts to promote reaction rate, provides higher molecular weight polymer than otherwise available and provides substantially decreased reaction time or decreased catalyst levels. Illustrative of the invention is the polymerization of 2,6-xylenol in an aromatic solvent medium using a catalyst comprising about 1 mole cupric bromide, 15 moles dibutyl amine, and ½ mole N,N′ diphenyl formamidine; the concentration of catalyst components based upon 100 moles of 2,6-xylenol.

BACKGROUND OF THE INVENTION

Field of the invention

This invention relates to the formation of synthetic resins from phenols, and more particularly, to the formation of polyphenylene ethers by the self-condensation of phenols in the presence of a catalyst comprising an amine-copper salt complex.

Description of the prior art

The polyphenylene ethers and processes for their formation are known in the art and described in U.S. Pat. Nos. 3,306,874 and 3,306,875 of Allan S. Hay and copending applications Ser. No. 807,126 and Ser. No. 807,076 filed concurrently herewith. The process involves the self condensation of a monovalent phenolic precursor using a catalyst formed from an amine and a copper salt. The phenols which may be polymerized by the process correspond to the following structural formula:

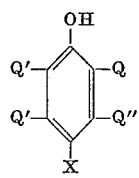

where X is a substituent selected from the group consisting of hydrogen, chlorine, bromine, and iodine; Q is a monovalent substituent selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and phenol nucleus; and Q′ and Q″ are the same as Q and in addition halogen; with the provision that Q, Q′ and Q″ are all free of a tertiary alpha-carbon atom.

Polymers formed from the above noted phenols will correspond to the following structural formula:

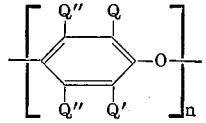

where the oxygen ether atom of one repeating unit is connected to the phenyl nucleus of the next repeating unit; Q, Q′ and Q″ are as above defined; and $n$ is a whole integer equal to at least 100.

SUMMARY OF THE INVENTION

The subject invention provides an improved process for the formation of polyphenylene ethers using the reactants of the above noted patents and applications and is predicated upon the discovery that the addition of a small but effective amount of a diaryl formamidine to a reaction mixture comprising a phenol, an amine and a copper salt provides polymer of higher molecular weight in substantially decreased reaction time or at substantially reduced catalyst concentration.

DESCRIPTION OF THE PREFERRED EMBODIMENTS

Polymer is formed in accordance with the invention by passing an oxygen-containing gas through a solution containing the phenolic precursor, the catalyst formed from the amine and copper salt, and the diaryl formamidine. The phenols preferred for purposes of the present invention correspond to the following formula:

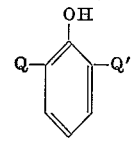

where Q and Q′ are as above defined. Examples of preferred phenols include 2,6-dimethylphenol, 2,6-diethylphenol, 2,6-diphenylphenol, 2-methyl-6-phenylphenol and 2-methyl-6-ethylphenol. The most preferred phenol is 2,6-dimethylphenol.

The catalyst is one formed from either a cuprous salt or a basic or non-basic cupric salt. Typical examples of suitable copper salts in accordance with the above-noted patents and applications include cuprous chloride, cupric chloride, cuprous bromide, cupric bromide, cuprous sulfate, cupric sulfate, cuprous acetate, cupric butyrate and cupric nitrate. The concentration of copper salt is desirably maintained low and preferably varies from about 0.2 to 2.5 moles per 100 moles of phenolic monomer.

The amine component of the catalyst may be any of a primary, secondary or tertiary amine exemplified by mono-, di- and trimethylamine, mono-, di-, and triethylamine, mono-, di-, and tripropylamine, mono-, di-, and tributylamine, mono-, and di-secondary propylamine, mono-, di-, and tri-benzylamine, ethylmethylamine, methylpropylamine, morpholine, dimethylpropylamine, allyldiethylamine, N,N,N′-trialkylethyldiamines, the N,N,N′, N′-tetraalkylpropyldiamines and the like. Additional examples of suitable amines can be found in the above-noted patents and applications. The concentration of amine in the reaction mixture may vary within wide limits, but is desirably added in low concentrations. A preferred range comprises from 2.0 to 25.0 moles per 100 moles of monomer.

The diaryl formamidines contemplated may be represented by the following structural formula:

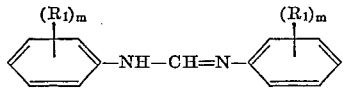

where each $R_1$ represents lower alkyl, preferably alkyl having from 1 to 4 carbon atoms, and $m$ is a whole integer ranging from 0 to the number of replaceable hydrogen atoms on the benzene nucleus. It should be understood that diaryl formamidine may be either symmetrical or unsymmetrical, i.e., the substituents on the two benzene rings may be the same or different. The concentration range for the diaryl guanidine in solution may vary within a range of from 0.025 to 3.0 moles per 100 moles of monomer.

It should be understood that while concentration ranges have been set forth for the various reactants in solution, these ranges may vary to some extent dependent upon various factors such as oxygen flow rate, reaction temperature and the like. For purposes of economy, lower concentrations of copper salt and amine are preferred. It is characteristic of the subject invention that the use of the diaryl formamidine permits formation of high molecular weight polymer with lower concentration of copper salt and amine than would otherwise be required.

The polymerization reaction is performed in a solvent of the general class disclosed in the patents above noted, aromatic solvents such as benzene and toluene providing best results. A low molecular weight alcohol such as methanol may be added to the solution in accordance with the teachings of copending application Ser. No. 807,076. Though the diaryl formamidine acts as a rate promoter in the polymerization reaction in combination with all amine-copper salts catalyst systems, the combination of the diaryl formamidine with some catalysts provides substantially better rates than its combination with others. The reason for this is not fully understood, but is believed to be dependent in part on the copper salt component used to form the catalyst. A preferred catalyst system is one formed from a non-basic cupric halide and a secondary alkyl amine.

Experimental results indicate that increased polymerization rate due to the addition of the diaryl formamidine is more pronounced in the latter stages of polymerization than in the earlier stages. The diaryl formamidine may be added initially to the reaction mixture along with the other reactants or at some point subsequent to the initiation of the reaction, for example, about 30 minutes after the reaction is initiated. Though not wishing to be bound by theory, a possible explanation for the improved results using the diaryl formamidine is that it prevents precipitation of the amine-copper salt catalyst by forming a solvent soluble complex. The catalysts are often insoluble in non-polar solvents unless they are also coupled with a molecule of the phenolic precursor. During the latter stages of polymerization, the concentration of phenolic hydroxyl groups becomes very low so that a complex can no longer be made soluble by coupling with the phenol. It is suggested that the diaryl formamidine, by forming a soluble complex, eliminates the necessity for additional coupling with phenol, so that the catalyst remains soluble and active throughout the polymerization. Although there is little positive evidence for this hypothesis, it appears the most satisfactory rationalization available at present for the effect of the diaryl formamidine.

The invention will be more fully illustrated by the following examples:

*Example 1.*—To a tube reaction vessel equipped with a Vibro-Mixer stirrer, thermometer, and an oxygen inlet tube was added 140 mls. of toluene, 1.29 g. of di-n-butylamine and 0.144 g. of anhydrous cuprous bromide. After stirring for 5 minutes, 10.0 g. of 2,6-xylenol were added and oxygen was introduced at a rate of 0.35 cubic ft./hr. At suitable intervals, the stirring was stopped and efflux times were measured in a calibrated 4 ml. pipette. At the end of two hours, 4 ml. of 50% acetic acid were added to kill the reaction. The acid layer was removed by centrifugation and the polymer precipitated with methanol. The polymer, reslurried with methanol and vacuum dried, weighed 9.1 g. (92.8% of theoretical) and had an intrinsic viscosity of 0.56 deciliter per gram (dl./g.) as measured in chloroform at 30° C.

*Example 2.*—The procedure of Example 1 was repeated with the addition of 0.196 g. of N,N'-diphenyl formamidine after 30 minutes of reaction time. The intrinsic viscosity was measured periodically throughout the reaction with results as set forth in the drawing. It can be seen that the addition of the N,N'-diphenyl formamidine substantially increases the rate of polymer build-up. After two hours 9.1 g. of poly (2,6-dimethylphenylene oxide) (92.8% of theoretical) was isolated and had an intrinsic viscosity of 0.70 dl./g.

*Example 3.*—This experiment was performed in the same manner as Example 1 except that the dibutylamine was replaced with 0.73 g. of n-butylamine, the cuprous bromide replaced with 0.223 g. of anhydrous cupric bromide, and 1.4 ml. of methanol was added to the catalyst. Polymer with an intrinsic viscosity of 0.50 dl./g. was isolated in 92.8% yield.

*Example 4.*—This experiment was performed in the same manner as Example 3 except that 0.196 g. of N,N'-diphenyl formamidine was added during the catalyst formation. After two hours, polymer with an intrinsic viscosity of 0.68 dl./g. was isolated in 92.8% yield.

It should be understood that changes may be made in the embodiments described above without departing from the invention as defined by the following claims.

We claim:

1. In a process for the preparation of a polyphenylene ether comprising an oxidative coupling reaction of a phenolic precursor corresponding to the structural formula

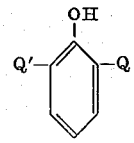

where Q is a monovalent substituent selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and phenol nucleus; and, Q' is the same as Q and in addition, halogen, with the proviso that Q and Q' are free of tertiary alpha-carbon atoms, in the presence of a catalyst comprising an amine and a copper salt; the improvement comprising the addition to the reaction of from 0.025 to 3.0 moles per 100 moles of said phenolic precursor of a diaryl formamidine of the formula

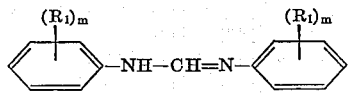

where each $R_1$ represents lower alkyl and $m$ is an integer varying between 0 and the number of replaceable hydrogen atoms of the benzene nucleus.

2. The process of claim 1 where Q and Q' are methyl.
3. The process of claim 1 where $m$ is 0.
4. The process of claim 1 where the amine is an alkyl amine.
5. The process of claim 1 where the copper salt is a copper halide.
6. The process of claim 1 where the catalyst is formed from dibutyl amine and non-basic cupric bromide.
7. The process of claim 1 where the concentration of the copper salt is of from 0.2 to 2.5 moles, the concentration of the amine is from 2.0 to 25.0 moles and the concentration of the diaryl formamidine is from 0.025 to 3.0, all based upon 100 moles of phenol.
8. The process of claim 7 where the solvent for the system is an aromatic solvent.
9. The process of claim 1 including a low molecular weight alcohol in the reaction mixture.

10. The process of claim 9 where the alcohol is methanol.

11. In a process for the formation of a poly-(2,6-dimethyl-1,4-phenylene) ether comprising an oxidative coupling reaction of 2,6-dimethylphenol in the presence of a catalyst comprising an amine and a copper salt; the improvement comprising the addition to the reaction of from 0.025 to 3.0 moles per 100 moles of 2,6-dimethylphenol of a diaryl formamidine of the formula

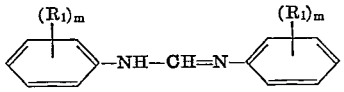

where each $R_1$ represents lower alkyl and $m$ is an integer ranging from 0 to the number of replaceable hydrogen atoms on the benzene nucleus.

12. The process of claim 11 where the diaryl formamidine is N,N'-diphenyl formamidine.

13. The process of claim 12 where the catalyst is formed from an alkyl amine and a copper halide.

14. The process of claim 13 where the amine is dibutylamine and the copper halide is cupric bromide.

15. The process of claim 13 where the amine is present in an amount of from 0.2 to 25.0 moles and the copper salt is in an amount of from 0.2 to 2.5 moles, each based upon 100 moles of phenol.

16. The process of claim 13 performed in an aromatic solvent.

17. The process of claim 16 where the reaction mixture contains methanol.

References Cited

UNITED STATES PATENTS

| | | | |
|---|---|---|---|
| 3,306,874 | 2/1967 | Hay | 260—47 |
| 3,306,875 | 2/1967 | Hay | 260—47 |
| 3,384,619 | 5/1968 | Hori et al. | 260—47 |
| 3,400,100 | 9/1968 | Van Dort et al. | 260—47 |
| 3,442,885 | 5/1969 | Wieden et al. | 260—47 |

HAROLD D. ANDERSON, Primary Examiner

M. GOLDSTEIN, Assistant Examiner